(12) United States Patent
Ray et al.

(10) Patent No.: US 9,126,450 B2
(45) Date of Patent: Sep. 8, 2015

(54) OFFSET PRINTING PROCESS USING LIGHT CONTROLLED WETTABILITY

(75) Inventors: Elton T. Ray, Lakeville, NY (US); Thomas Robson, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1713 days.

(21) Appl. No.: 12/510,672

(22) Filed: Jul. 28, 2009

(65) Prior Publication Data

US 2011/0023740 A1 Feb. 3, 2011

(51) Int. Cl.
*B41M 1/06* (2006.01)
*G03B 27/42* (2006.01)
*B41M 7/00* (2006.01)

(52) U.S. Cl.
CPC ............. *B41M 1/06* (2013.01); *G03B 27/42* (2013.01); *B41M 7/0081* (2013.01); *Y10T 428/24802* (2015.01)

(58) Field of Classification Search
USPC .............. 101/463.1, 451, 450.1, 465, 478
See application file for complete search history.

(56) References Cited

U.S. PATENT DOCUMENTS

| | | | |
|---|---|---|---|
| 5,320,789 | A | 6/1994 | Nishii et al. |
| 6,146,798 | A | 11/2000 | Bringans et al. |
| 6,182,569 | B1 | 2/2001 | Rorke et al. |
| 6,238,839 | B1* | 5/2001 | Tomita et al. ............... 430/278.1 |
| 7,020,355 | B2 | 3/2006 | Lahann et al. |
| 7,194,956 | B2* | 3/2007 | Mori et al. .................... 101/467 |
| 2005/0235852 | A1* | 10/2005 | Leenders et al. ............ 101/450.1 |
| 2007/0137509 | A1 | 6/2007 | Fork |
| 2008/0041257 | A1* | 2/2008 | Teng .............................. 101/453 |

FOREIGN PATENT DOCUMENTS

| | | |
|---|---|---|
| EP | 1798606 | 6/2007 |
| JP | 11258785 A * | 9/1999 |

OTHER PUBLICATIONS

U.S. Patent Application filed of even date herewith, of Elton T. Ray, entitled "Laser Printing Process Using Light Controlled Wettability" 21 pages specification, 3 drawing sheets, not yet published.
Ho Sun Lim et al., UV-Driven Reversible Switching of a Roselike Vanadium Oxide Film Between Superhydrophobicity and Superhydrophilicity, J. Am. Chem. Soc., Mar. 15, 2007, pp. 4128-4127.
http://www.scientificamerican.com/article, Beyond Self-Cleaning Switchable Surfaces, Jul. 21, 2008, 2 pages.
Peter Forbes, http://www.scientificamerican.com/article, Self-Cleaning Materials: Lotus-Leaf Inspired Nanotechnology, Jul. 30, 2008, 6 pages.
P. Matusche, et al., Water Soluble Photo-resins Based on Polymeric Azo Compounds, Reactive Polymers, Elsevier Science B.V., 1995, pp. 271-278.

* cited by examiner

*Primary Examiner* — Joshua D Zimmerman
(74) *Attorney, Agent, or Firm* — Marylou J. Lavoie, Esq. LLC (57) ABSTRACT

A lithographic printing method including exposing an imaging surface layer of a printing plate to a first expose source to render the surface layer uniformly hydrophilic; the surface layer comprising a compound having reversible light controlled wettability whereby the surface layer is reversibly hydrophilic and hydrophobic. The surface layer is disposed over a variable image portion of the printing plate imaging surface or disposed over substantially all of the printing plate imaging surface. The surface is exposed to a second expose source to render image areas of the surface layer hydrophobic. Polar liquid attracts to non-image hydrophilic areas. Hydrophobic liquid colorant attracts to hydrophobic image areas. The surface layer is contacted an offset receiving member and the image is transferred to an image receiving substrate.

11 Claims, 10 Drawing Sheets

OFFSET PRINTING PROCESS USING LIGHT CONTROLLED WETTABILITY

CROSS-REFERENCE TO RELATED APPLICATIONS

U.S. Pat. No. 8,665,489, Ser. No. 12/510,705, filed concurrently herewith, entitled "Laser Printing Process Using Light Controlled Wettability," with the named inventors Elton T. Ray and Thomas Robson, the disclosure of which is totally incorporated herein by reference, discloses a light controlled laser imaging method includes exposing a surface layer of an imaging member substrate to a first expose source to render the surface layer uniformly hydrophilic, wherein the surface layer comprises a polymer film including a compound having reversible light controlled wettability whereby the surface layer is reversibly hydrophilic and hydrophobic; exposing the surface layer to a second expose source in an image-wise fashion to render image areas of the surface layer hydrophobic; exposing the surface layer to a polar liquid wherein the polar liquid attracts to non-image hydrophilic areas; exposing the surface layer to a hydrophobic liquid colorant wherein the hydrophobic liquid colorant attracts to hydrophobic image areas; contacting the surface layer with an image receiving substrate to transfer the image thereto; fixing the image; and optionally, treating the surface layer to remove residual hydrophobic liquid colorant.

BACKGROUND

The present disclosure relates to lithographic printing. More particularly, this disclosure relates to a rewriteable lithographic printing plate and systems and methods for rewriting the printing plate using a surface having light controlled wettability on all or a portion of the printing plate.

Conventional lithographic printing plates are prepared with image-wise hydrophobic-hydrophilic areas. Water is then exposed to the hydrophobic/hydrophilic surfaces of the plate. The water avoids all of the hydrophobic areas, but clings to all of the hydrophilic areas. The surface of the plate is then exposed to an oil-based ink. Since the oil-based ink and the water are immiscible, the oil-based ink avoids the areas that are coated with water and adheres to the remaining areas. In other words, the oil only clings to the hydrophobic areas. The oil-based ink and water is then transferred to a blanket cylinder and then onto a recording medium, such as paper.

Figure 1:
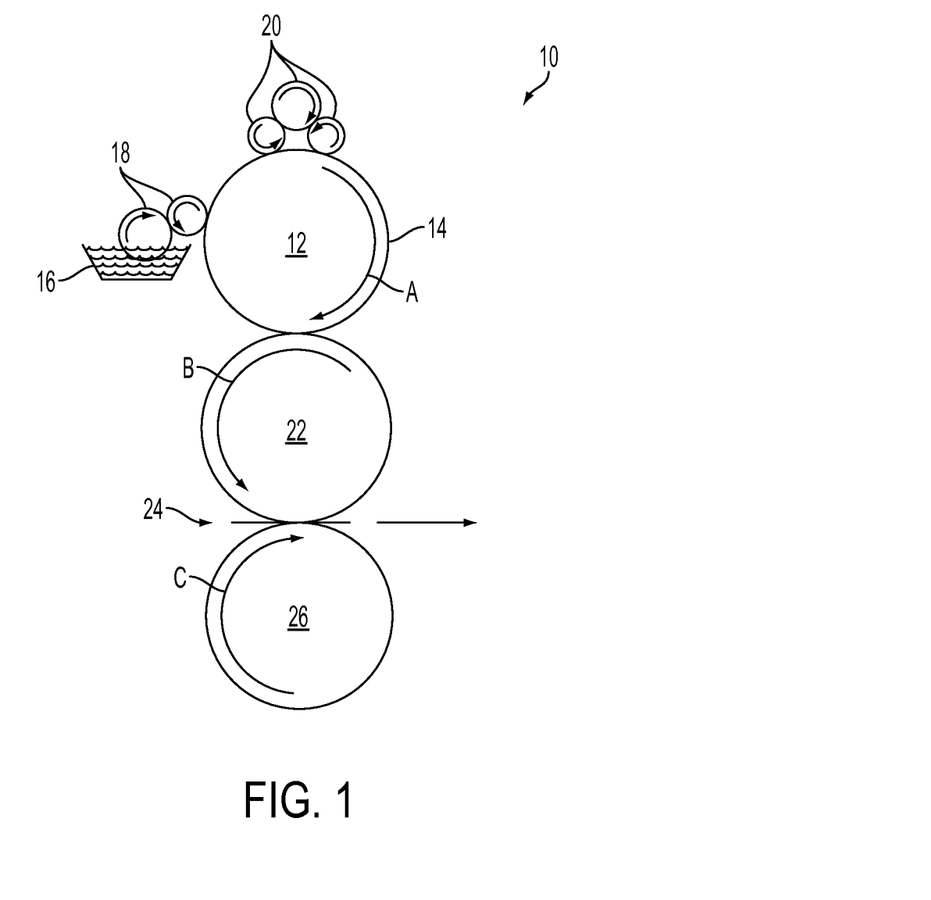
FIG. 1 illustrates an offset lithographic printing device generally.

FIG. 1 illustrates generally an offset lithographic printing device 10 including a printing plate cylinder 12 having an imaging plate 14 wherein an image is etched into the surface of the imaging plate 14. The printing plate is made wet with water from a water source 16 and applied such as with dampening rollers 18. The water adheres to the parts of the plate that do not contain an image. Inking rollers 20 then coat the portions of the printing plate that are not wet. The diameter of the inking roller or rollers 20 are selected so that one full rotation of the roller will imprint the image in its entirety. The water acts as a resist, preventing the ink from sticking to the wet parts of the plate. The ink is transferred to offset cylinder 22 and then onto an image receiving substrate such as paper or stock 24. The image is fixed such as by pressure from impression cylinder 26 rotatably contacting offset cylinder 22. Plate cylinder 12, offset cylinder 22, and impression cylinder 26 are movable in a rotary fashion indicated by arrows A, B, and C.

Conventional lithographic printing plates are generally prepared outside of printing presses. Thus, a plate must first be prepared using a dedicated printing plate preparation machine and then the prepared plate must be installed in a lithographic printing press. This preparation and installation wastes valuable time and must be performed for each image that is to be printed. This problem is compounded in color lithographic printing systems which require a different plate for each color of an image to be prepared and installed. Additionally, newly prepared plates cannot be installed without first removing and disposing of any plates that are already in the press and which are being replaced. The plates being replaced cannot be rewritten and, therefore, represent a significant waste of materials, energy and time.

The preparation time of conventional lithographic printing plates is also very lengthy. Each plate requires several minutes to prepare. Typically, blank lithographic printing plates have a hydrophobic surface which is conditioned to provide hydrophilic regions which are distributed on the surface in an image-wise manner. One example of a lithographic printing plate preparation process involves a blank lithographic printing plate having a surface that is coated with a hydrophobic photopolymer film. This film is exposed to light from a laser. The photopolymer reacts to the light and the light-exposed areas of the hydrophobic photopolymer film are removed by exposing the surface to a chemical solvent. This process can be wasteful because the hydrophobic photopolymer film is not recoverable and the solvent requires special handling and control.

Another example of a conventional lithographic printing plate preparation method involves a blank lithographic printing plate having a surface coated with a hydrophilic silicone rubber film. The blank lithographic printing plate is also exposed to light from a laser in an image-wise manner. However, the laser removes the silicone rubber film and the chemical solvent exposing step is avoided.

Another conventional lithographic printing plate has a surface with an oleophobic silicone rubber film distributed in an image-wise manner. This type of plate may be used in a waterless lithographic printing process which has an advantage that the ink and the water do not have to be carefully balanced. The waterless lithographic printing plate has two different areas. A first area has an oleophobic silicone rubber film to which the ink will not bond and a second area which has had the oleophobic silicone rubber removed and which exposes an underlying substrate to which the ink will bond. The ink is then exposed to the surface of the plate and the ink only covers the areas where the silicone rubber has been removed. Subsequently, the ink is transferred to a blanket cylinder and then onto a recording medium.

U.S. Pat. No. 6,146,798, which is hereby incorporated by reference herein in its entirety, discloses a method and system for lithographic printing by controlling the surface energy of a printing plate to affect the hydrophilic and hydrophobic properties of the printing plate. These properties enable the ink to be applied to the printing plate in an image-wise manner and provides for rapid production of images on a recording medium. The lithographic printing plate may be rewritten repeatedly between printing jobs or may even be rewritten between individual recording media.

While currently available lithographic printing systems are suitable for their intended purposes, there remains a need for an improved lithographic printing system and process that provides on-demand offset printing. There further remains a need for a method and printing plate that enables inline variable data printing in an offset printing workflow. There further remains a need for a method and printing plate that can be used with toner-based systems and/or can be used with the same inks as in conventional printing plate technology to maintain a coherent visual effect.

SUMMARY

Described herein is a lithographic printing method comprising exposing an imaging surface layer of a printing plate to a first expose source to render the surface layer uniformly hydrophilic; wherein the surface layer comprises a polymer film including a compound having reversible light controlled wettability whereby the surface layer is reversibly hydrophilic and hydrophobic; wherein the surface layer is disposed over a portion of the printing plate imaging surface; or wherein the surface layer is disposed over substantially all of the printing plate imaging surface; exposing the surface layer to a second expose source in an image-wise fashion to render image areas of the surface layer hydrophobic; exposing the surface layer to a polar liquid wherein the polar liquid attracts to non-image hydrophilic areas; exposing the surface layer to a hydrophobic liquid colorant wherein the hydrophobic liquid colorant attracts to hydrophobic image areas; contacting the surface layer with an offset receiving member to transfer the image to the offset receiving member; contacting the offset receiving member with an image receiving substrate to transfer the image thereto; fixing the image; and optionally, treating the surface layer to remove residual hydrophobic liquid colorant.

Further described is a lithographic printing plate having light controlled wettability comprising a substrate; a surface layer disposed on the substrate, wherein the surface layer comprises a compound having reversible light controlled wettability whereby the surface layer is reversibly hydrophilic and hydrophobic; wherein exposure of the surface layer to a first expose source provides a uniformly hydrophilic surface for attracting a polar liquid; and wherein exposure of the surface layer to a second expose source in an image-wise fashion provides a surface having hydrophilic non-image areas and hydrophobic images areas for attracting a hydrophobic liquid colorant.

Further described is a lithographic printing method comprising exposing an imaging surface layer of a printing plate to a first expose source to render the surface layer uniformly hydrophobic; wherein the surface layer comprises a polymer film including a compound having reversible light controlled wettability whereby the surface layer is reversibly hydrophobic and hydrophilic; wherein the surface layer is disposed over a portion of the printing plate imaging surface, or wherein the surface layer is disposed over substantially all of the printing plate imaging surface; exposing the surface layer to a second expose source in an image-wise fashion to render image areas of the surface layer hydrophilic; exposing the surface layer to a non-polar liquid wherein the non-polar liquid attracts to non-image hydrophobic areas; exposing the surface layer to a hydrophilic liquid colorant wherein the hydrophilic liquid colorant attracts to hydrophilic image areas; contacting the surface layer with an offset receiving member to transfer the image to the offset receiving member; contacting the offset receiving member with an image receiving substrate to transfer the image thereto; fixing the image; and optionally, treating the surface layer to remove residual hydrophilic liquid colorant.

Still further described is a lithographic printing plate having light controlled wettability comprising a substrate; a surface layer disposed on the substrate, wherein the surface layer comprises a compound having reversible light controlled wettability whereby the surface layer is reversibly hydrophilic and hydrophobic; wherein exposure of the surface layer to a first expose source provides a uniformly hydrophobic surface for attracting a non-polar liquid; and wherein exposure of the surface layer to a second expose source in an image-wise fashion provides a surface having hydrophobic non-image areas and hydrophilic images areas for attracting a hydrophilic liquid colorant.

DETAILED DESCRIPTION

Described herein is a lithographic printing method comprising exposing an imaging surface layer of a printing plate to a first expose source to render the surface layer uniformly hydrophilic; wherein the surface layer comprises a polymer film including a compound having reversible light controlled wettability whereby the surface layer is reversibly hydrophilic and hydrophobic; wherein the surface layer is disposed over a portion of the printing plate imaging surface; or wherein the surface layer is disposed over substantially all of the printing plate imaging surface; exposing the surface layer to a second expose source in an image-wise fashion to render image areas of the surface layer hydrophobic; exposing the surface layer to a polar liquid wherein the polar liquid attracts to non-image hydrophilic areas; exposing the surface layer to a hydrophobic liquid colorant wherein the hydrophobic liquid colorant attracts to hydrophobic image areas; contacting the surface layer with an offset receiving member to transfer the image to the offset receiving member; contacting the offset receiving member with an image receiving substrate to transfer the image thereto; fixing the image; and optionally, treating the surface layer to remove residual hydrophobic liquid colorant. The present system and method provide on-demand offset printing including a variable data area on all or a portion of an offset printing plate. Inline variable data can be printed in an offset lithographic printing workflow. The method and printing plate system herein can be used with toner-based systems and/or can be used with the same inks as in conventional printing plate technology to maintain a coherent visual effect.

Figure 2:
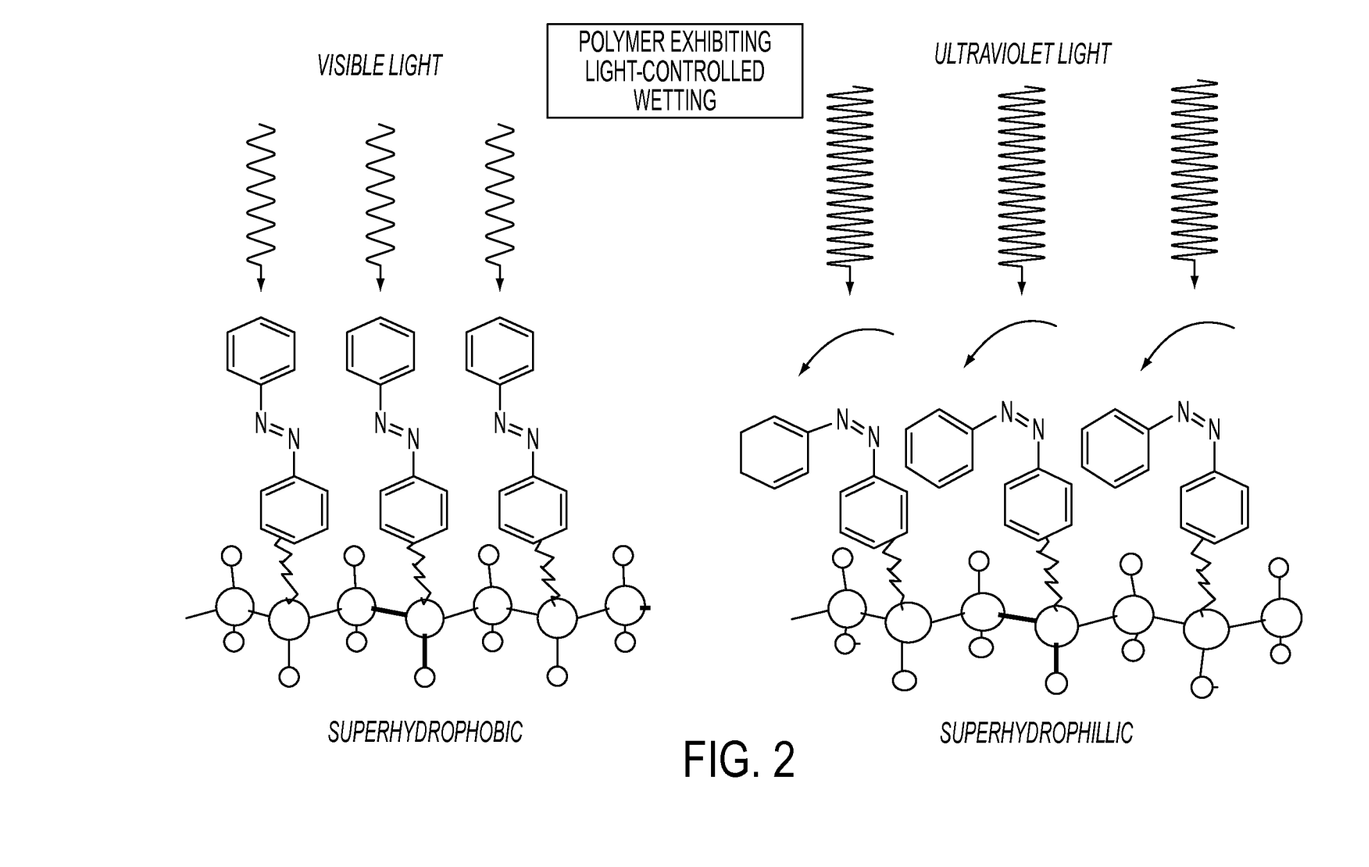
FIG. 2 illustrates a polymer exhibiting light-controlled wettability.
Figure 3:
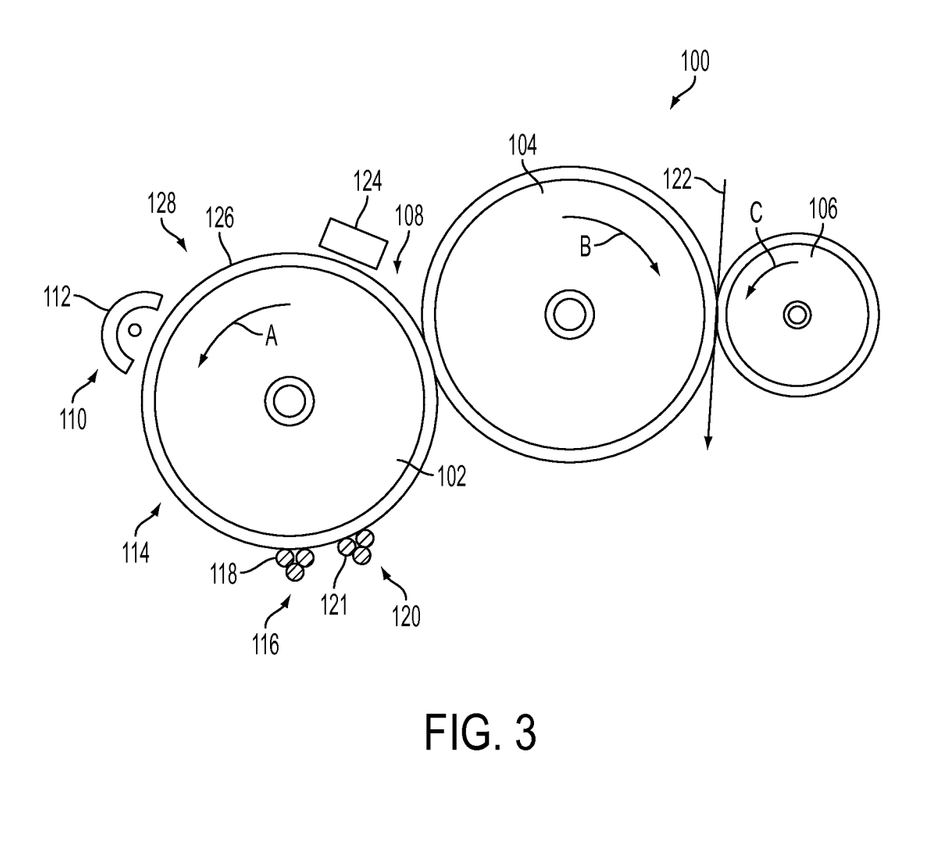
FIG. 3 illustrates an offset lithographic printing device in accordance with the present disclosure.

Wettability is the tendency for a surface to attract or repel liquids. The lithographic offset printing devices and methods herein employ printing plates having a wettability that can be controlled by exposure to different wavelengths of light to selectively attract liquid colorant to the surfaces. FIG. 3 illustrates a polymer, azobenzene, having light controlled wettability. The azobenzene molecule is known to undergo photoisomerization under different wavelengths of light. One form of the molecule is hydrophilic (cis form) and one form is hydrophobic (trans form). As shown in FIG. 2, upon exposure to visible light or heat, azobenzene material takes on the trans form and is superhydrophobic. Superhydrophic can be described as when a droplet of water or droplet of liquid forms a high contact-angle such as greater than about 150° although not limited. Conversely, upon exposure to ultraviolet light, azobenzene takes on the cis form and becomes superhydrophilic. Superhydrophilic can be described as when a droplet of water or droplet of other liquid forms a low contact angle such as less than about 90°, although not limited. The photoisomerization of azobenzene is extremely rapid, on the order of seconds or picoseconds.

The printing plate surface material having reversible light controlled wettability herein can be an azo compound of the formula wherein R and R' can be any suitable component provided the material has the reversible light controlled wettability characteristic, for example, wherein R and R' are each independently selected from:

alkyl, wherein alkyl can be linear, branched, saturated, unsaturated, cyclic, substituted, and unsubstituted alkyl, and wherein hetero atoms or groups may be present; or aryl wherein aryl can be unsubstituted or substituted and wherein hetero atoms or groups may be present;

wherein hetero atoms or groups can be oxygen, nitrogen, sulfur, silicon, phosphorus atoms or groups, and the like.

Optionally, R and R' can be independently selected from:
alkyl having from about 1 to about 55 carbon atoms, although the number of carbon atoms can be outside of this range, wherein alkyl can be linear, branched, saturated, unsaturated, cyclic, substituted, and unsubstituted alkyl, and wherein hetero atoms such as oxygen, nitrogen, sulfur, silicon, phosphorus, and the like either may or may not be present in the alkyl; or aryl having from about 6 to about 26 carbon atoms, although the number of carbon atoms can be outside of this range, including unsubstituted and substituted aryl groups, and wherein hetero atoms, such as oxygen, nitrogen, sulfur, silicon, phosphorus, and the like either may or may not be present in the aryl.

In a specific embodiment, the surface material having reversible light controlled wettability comprises azobenzene of the formula In embodiments, a film comprising the surface material having reversible light controlled wettability is disposed about the printing plate cylinder. In embodiments, the film comprising the surface material can be disposed as a coating on a metal drum. The film can include any suitable polymer film such as polyethylene terephthalate, polyethylene, polypropylene, polyester, polycarbonates, acrylic polymers, vinyl polymers, cellulose polymers, polysiloxanes, polyamides, polyurethanes, block, alternating, or random copolymers thereof, and mixtures thereof. In embodiments, the polymer can be selected to affect the wettability, for example, the polymer can be selected to increase the hydrophobic characteristic of the printing plate surface.

In another embodiment, the surface material having reversible light controlled wettability can comprise a nanostructured vanadium oxide film. For example, a nanostructured $V_2O_5$ film as described in Ho Sun Lim, et al., "UV-Driven Reversible Switching of a Roselike Vanadium Oxide Film between Superhydrophobicity and Superhydrophilicity," J. Am. Chem. Soc. 2007, 129, pp. 4128-4129, which is hereby incorporated by reference herein, can be used for the surface material herein.

FIG. 3 illustrates an embodiment of a lithographic printing system 100 in accordance with the present disclosure. Lithographic printing system 100 includes a printing plate 102, an offset roller 104, and pressure roller 106. Each of the printing plate 102, the offset roller 104, and the pressure roller 106 rotate in the direction of the corresponding arrows A, B, and C. Printing plate 102 has a surface 108 comprising on at least a portion thereof a material having reversible light controlled wettability as described herein. The surface layer can comprise a variable image area or an entire surface comprising a polymer film including a compound having reversible light controlled wettability whereby the surface layer is reversibly hydrophilic and hydrophobic. In one embodiment, the entire surface 108 comprises the material having reversible light controlled wettability such that the entire image is a variable image. In another embodiment, a portion of the surface 108 comprises the material having reversible light controlled wettability such that the surface 108 includes a fixed image area and a variable image area. The fixed image area can be a conventional etched image as is known in the art. Surface 108 rotates through a number of processing stations that are positioned about the periphery of the printing plate 102. Surface 108 rotates through a first expose source 110 which can be any known or later developed expose source that renders the surface layer 108 uniformly hydrophilic in those portions of surface layer 108 comprising the material having reversible light controlled wettability. In a specific embodiment, the first expose source is an ultraviolet (UV) radiation expose source 112 (e.g., a UV lamp).

Surface 108 rotates form the first expose source to a second expose source 114. At the second expose source 114, the surface 108 is exposed to light in an image-wise manner. The exposure source 114 can include any known or later developed type of exposing device, such as a visible light expose source, a laser raster output scanner (ROS), a page-width light emitting diode printbar, or the like. The second expose source 24 exposes the surface layer 108 in an image-wise fashion to render image areas of the surface layer hydrophobic. The surface 108 then rotates to a polar liquid (for example, water) exposing station 116. At the water exposing station 116, the surface layer 108 is exposed to water 118. Water 118 adheres only to the hydrophilic areas of the surface layer 108 such that the water 118 adheres in an image-wise manner. Surface 108 then rotates to hydrophobic liquid colorant exposing station 120 wherein the hydrophobic liquid colorant 121 attracts to the hydrophobic image areas and is repelled form and does not adhere to hydrophilic areas on the surface 108 that are coated with water 118.

The surface 108 then rotates into contact with the offset roller 104. The ink from the printing plate 102 adheres to the offset roller 104 in an image-wise manner. Offset roller 104 then rotates into contact with a recording medium 122 which receives the ink. The printing method can include fixing the image on the recording medium, such as by exposing the image to a light source, a heat source, or by exerting pressure on the image, or a combination thereof. Typically, the image is fixed by use of pressure rollers.

After the printing plate 102 contacts the surface 108 with the offset roller 104, the surface 108 rotates to a cleaning station 124. Cleaning station 124 removes any residual colorant and water that remain on the surface 108 of the printing plate 102.

In an embodiment, the surface 108 rotates to a replenishing station 126 for replenishing an aqueous medium on the surface 108.

Surface 108 rotates to an optional erasing station 128. The erasing station 128 can comprise a discrete erasing station that discharges any remaining charge from the surface 108. Alternately, surface 108 can rotate to first expose source to render the surface layer uniformly hydrophilic in its entirety or in the variable image area. Alternately, the surface need not be erased, so that the image-wise areas remain on the printing plate to create another identical lithographic inking and transfer.

Surface 108 then rotates back to the first expose source 110 and the process is repeated.

Figure 4:
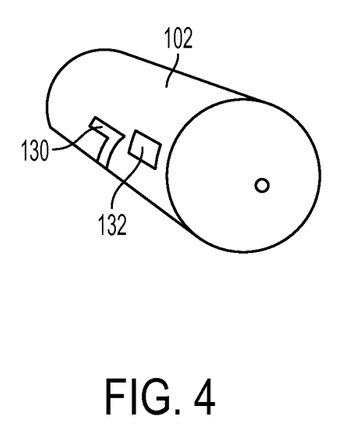
FIG. 4 illustrates a lithographic cylinder having a fixed image area and a variable image area in accordance with an embodiment of the present disclosure.

FIG. 4 illustrates an embodiment wherein the printing plate 102 comprises a lithographic cylinder having a fixed image area. Fixed image area 130 can comprise a conventional etched image as known in the art. Fixed image area 130 can persist for the lifetime of the printing run. Fixed image area can be imaged once for the lifetime of the printing run. Alternately, the fixed image area can be re-imaged every time the variable image area is imaged.

In embodiments, a single expose source is used to expose both fixed and variable image areas. In this configuration, the expose source, the imaging member, or a combination thereof is movable such that the single expose source can be directed to the desired area as needed.

In another embodiment, two or more expose sources are provided and each individual expose source can be directed to a fixed or variable image area. For example, a first expose source can be dedicated to a fixed image area, and a second expose source can be dedicated to a variable image area.

Further, multiple fixed and variable image areas can be provided, such as, for example, two or more areas that contain fixed images and two or more areas that contain variable image areas. The configurations described herein are exemplary and not limiting. Numerous variations are contemplated and comprise a part of the present disclosure.

The printing plate 102 further comprises a variable image area 132 that can be re-imaged after each pass of the printing cylinder. Variable image area 132 comprises the surface layer herein including a compound having reversible light controlled wettability.

Figure 5:
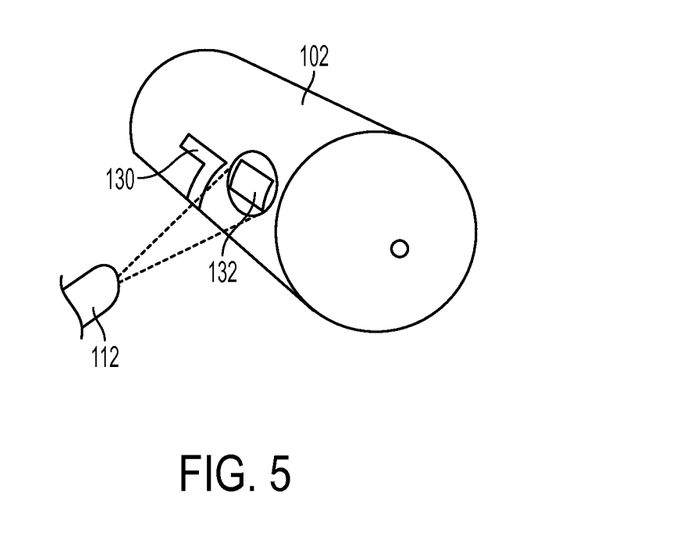
FIG. 5 illustrates the lithographic cylinder of FIG. 4 wherein an ultraviolet lamp expose source is directed over the variable image area.

As shown in FIG. 5, with reference to the printing plate embodiment of FIG. 4, any pre-existing image in the variable data area 132 can be erased by UV lamp 112 rendering the entire area hydrophilic.

Figure 6:
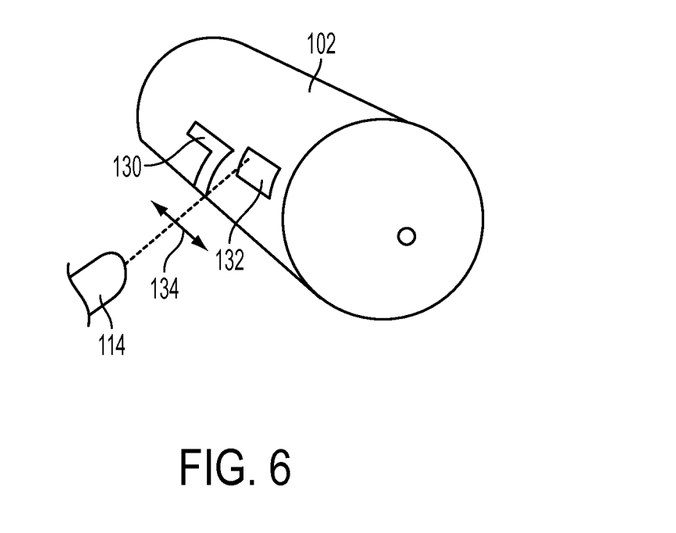
FIG. 6 illustrates the lithographic cylinder of FIG. 4 wherein a laser expose source is directed over the variable image area and the fixed image area.

Turning to FIG. 6, the hydrophobic image can then be drawn on to the variable data area by shining visible spectrum laser 114 as indicated by the arrow 134. This is similar to the manner in which an image is written to a drum photoreceptor in a laser printer.

Figure 7:
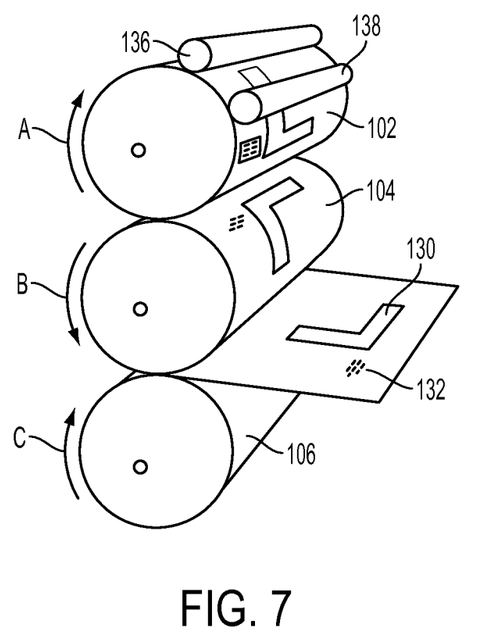
FIG. 7 illustrates an offset lithographic printing device having a fixed image area and a variable image area in accordance with the present disclosure.

The offset lithographic printing process then proceeds. FIG. 7 is an illustration of a portion of an offset lithographic printing device herein including printing plate cylinder 102, offset cylinder (or blanket cylinder) 104, and impression (or pressure) cylinder 106, having a surface 108 including a fixed image area 130 and a variable image area 132. Dampening roller 136 is used to expose the surface layer 108 to water 118. Ink roller 138 is used to expose the surface layer to the hydrophobic liquid colorant (ink).

Figure 8:
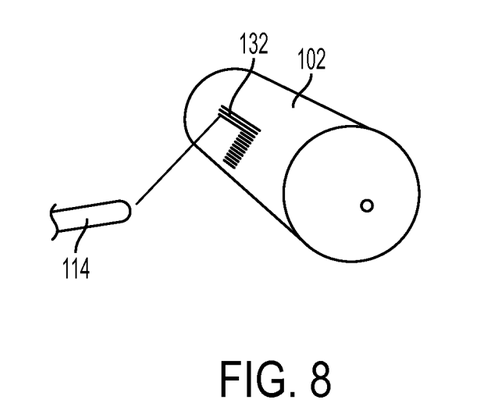
FIG. 8 illustrates a lithographic printing plate cylinder wherein the entire image area is a variable image area in accordance with an embodiment of the present disclosure.
Figure 9:
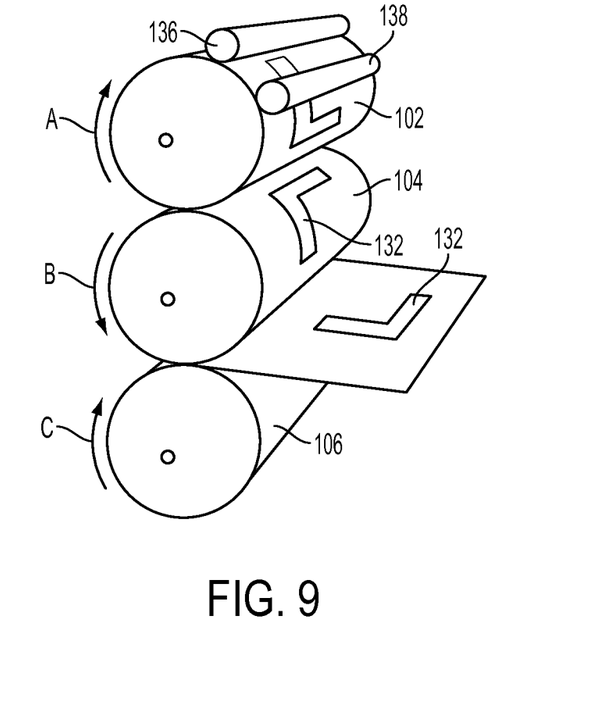
FIG. 9 illustrates an offset lithographic printing device including the lithographic cylinder of FIG. 8.
Figure 10:
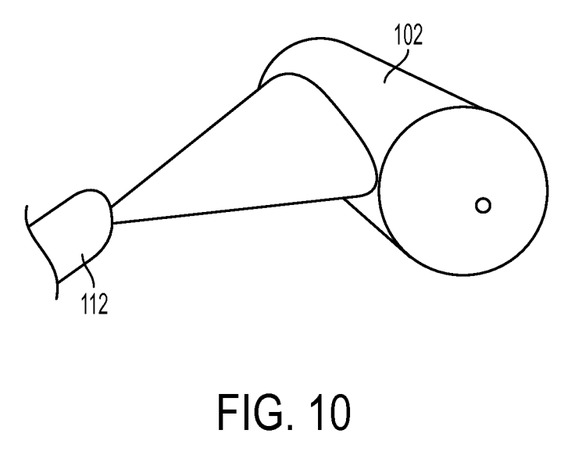
FIG. 10 illustrates the lithographic cylinder of FIG. 9 wherein an ultraviolet lamp expose source is directed over the entire variable image.

FIG. 8 illustrates a lithographic printing plate cylinder 102 wherein the entire surface 108 comprises an image area that is a variable image area 132. In this embodiment, the entire image surface area 108 comprises the present reversible light controlled wettability material, and a variable image is dawn on to the surface in a rasterized format using the laser 114 so that the entire image is variable. FIG. 9 illustrates an offset lithographic printing device including the lithographic cylinder of FIG. 8. FIG. 10 illustrates the lithographic cylinder of FIG. 8 wherein an ultraviolet lamp 112 expose source is directed over the entire variable image.

Figure 11:
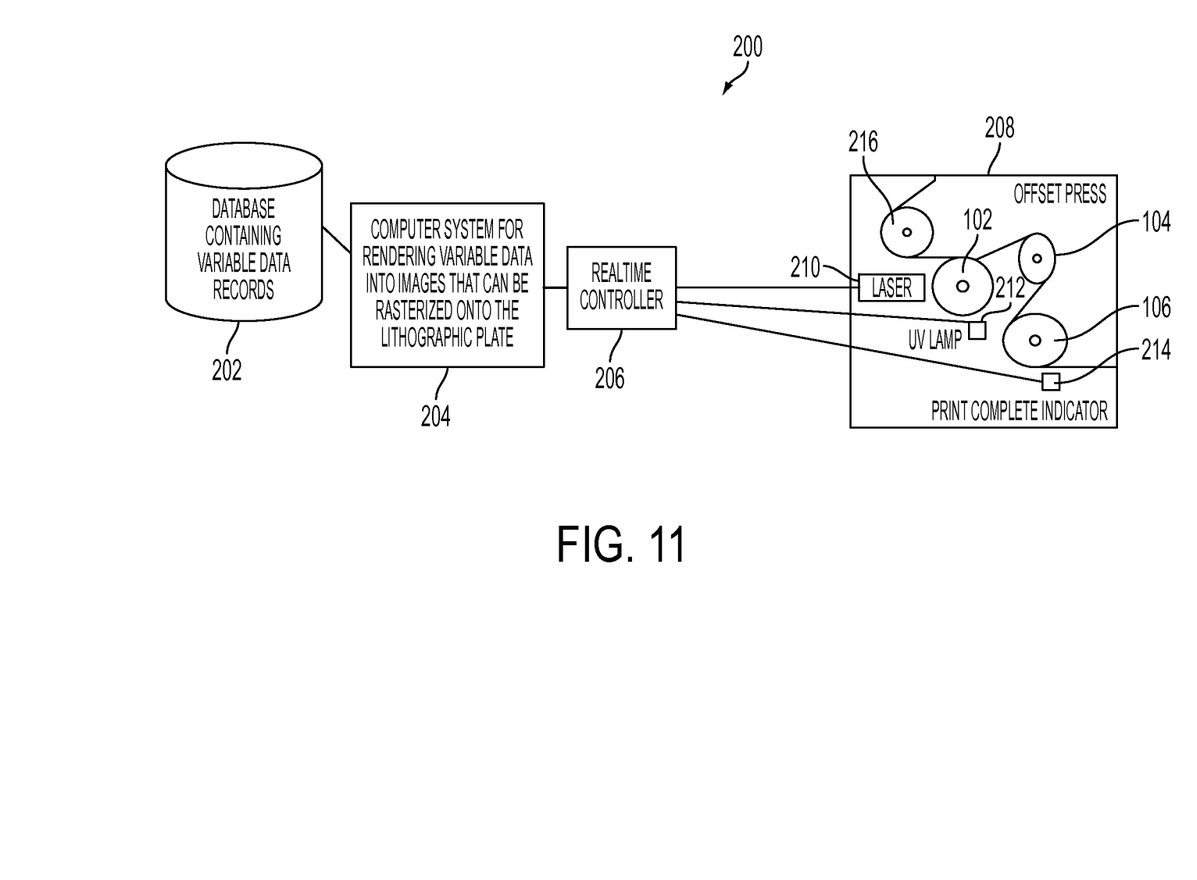
FIG. 11 is a block diagram illustrating a variable printing lithographic system in accordance with the present disclosure.

FIG. 11 is a block diagram illustrating a variable printing lithographic system in accordance with the present disclosure. The system 200 includes a database 202 containing variable data records. Database 202 is in communication with a computer system 204 for rendering variable data into images that can be rasterized onto the lithographic printing plate 102. Realtime controller 206 is in communication with computer system 204 and offset lithographic press device 208 including laser 210, UV lamp 212, and print control device 214 which includes a print complete indicator. Device 208 includes tension roller 216, printing plate 102, offset roller 104, and pressure roller 106 as described herein.

Any desired or suitable colorant can be used in embodiments herein including toner-based colorants known for use in the lithographic arts. In embodiments, a hydrophobic liquid colorant is used and can comprise a dye, a pigment, or a mixture thereof, although not limited.

The lithographic printing plate and method herein has been described with respect to a printing plate having light controlled wettability comprising a substrate; a surface layer disposed on the substrate, wherein the surface layer comprises a compound having reversible light controlled wettability whereby the surface layer is reversibly hydrophilic and hydrophobic; wherein exposure of the surface layer to a first expose source provides a uniformly hydrophilic surface for attracting a polar liquid; and wherein exposure of the surface layer to a second expose source in an image-wise fashion provides a surface having hydrophilic non-image areas and hydrophobic images areas for attracting a hydrophobic liquid colorant. In one embodiment, a portion of the surface layer comprises a polymer film including a compound having reversible light controlled wettability whereby the surface layer is reversibly hydrophobic and hydrophobic to provide a variable image area; and wherein a portion of the surface layer comprises a fixed (non-variable) image area, such as a conventional etched printing plate image.

In an alternate embodiment, a hydrophilic colorant can be used. In this embodiment, a lithographic printing method comprises exposing an imaging surface layer of a printing plate to a first expose source to render the surface layer uniformly hydrophobic; wherein the surface layer comprises a polymer film including a compound having reversible light controlled wettability whereby the surface layer is reversibly hydrophobic and hydrophilic; wherein the surface layer is disposed over a portion of the printing plate imaging surface, or wherein the surface layer is disposed over substantially all of the printing plate imaging surface; exposing the surface layer to a second expose source in an image-wise fashion to render image areas of the surface layer hydrophilic; exposing the surface layer to a non-polar liquid wherein the non-polar liquid attracts to non-image hydrophobic areas; exposing the surface layer to a hydrophilic liquid colorant wherein the hydrophilic liquid colorant attracts to hydrophilic image areas; contacting the surface layer with an offset receiving member to transfer the image to the offset receiving member; contacting the offset receiving member with an image receiving substrate to transfer the image thereto; fixing the image; and optionally, treating the surface layer to remove residual hydrophilic liquid colorant.

Further contemplated herein is a lithographic printing plate having light controlled wettability comprising a substrate; a surface layer disposed on the substrate, wherein the surface layer comprises a compound having reversible light controlled wettability whereby the surface layer is reversibly hydrophilic and hydrophobic; wherein exposure of the surface layer to a first expose source provides a uniformly hydrophobic surface for attracting a non-polar liquid; and wherein exposure of the surface layer to a second expose source in an image-wise fashion provides a surface having hydrophobic non-image areas and hydrophilic images areas for attracting a hydrophilic liquid colorant.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A lithographic printing method comprising:
exposing an imaging surface layer of a printing plate to a first light expose source to render the surface layer uniformly hydrophilic;
wherein the surface layer comprises a polymer film including a compound having reversible light controlled wettability whereby the surface layer is reversibly hydrophilic and hydrophobic upon exposure to different wavelengths of light;
wherein the surface layer is disposed over a portion of the printing plate imaging surface; or
wherein the surface layer is disposed over substantially all of the printing plate imaging surface;
exposing the surface layer to a second light expose source in an image-wise fashion to render image areas of the surface layer hydrophobic;
exposing the surface layer to a polar liquid wherein the polar liquid attracts to non-image hydrophilic areas;
exposing the surface layer to a hydrophobic liquid colorant wherein the hydrophobic liquid colorant attracts to hydrophobic image areas;
contacting the surface layer with an offset receiving member to transfer the image to the offset receiving member;
contacting the offset receiving member with an image receiving substrate to transfer the image thereto;
optionally, fixing the image; and
optionally, treating the surface layer to remove residual hydrophobic liquid colorant.

2. The lithographic printing method of claim 1, wherein the first expose source is an ultra-violet light expose source; and wherein the second expose source is a visible light expose source.

3. The lithographic printing method of claim 1, wherein the compound having reversible light controlled wettability is an azo compound of the formula wherein R and R' are each independently selected from alkyl, wherein alkyl can be linear, branched, saturated, unsaturated, cyclic, substituted, and unsubstituted alkyl, and wherein hetero atoms may be present; or
aryl wherein aryl can be unsubstituted or substituted and wherein hetero atoms may be present.

4. The lithographic printing method of claim 3, wherein the azo compound comprises azobenzene of the formula 5. The lithographic printing method of claim 1, wherein the compound having reversible light controlled wettability comprises a polymer film including a compound selected from the group consisting of polyethylene terephthalate, polyethylene, polypropylene, polyester, polycarbonates, acrylic polymers, vinyl polymers, cellulose polymers, polysiloxanes, polyamides, polyurethanes, block, alternating, or random copolymers thereof, and mixtures thereof.

6. The lithographic printing method of claim 1, wherein the compound having reversible light controlled wettability is a nanostructured vanadium oxide film.

7. The lithographic printing method of claim 1, where the polar liquid comprises water.

8. The lithographic printing method of claim 1, wherein the hydrophobic liquid colorant comprises a dye, a pigment, or a mixture thereof.

9. The lithographic printing method of claim 1, wherein the step of fixing the image is performed and wherein fixing the image comprises exposing the image to a light source, exposing the image to a heat source, exerting pressure on the image, or a combination thereof.

10. The lithographic printing method of claim 1, wherein a portion of the surface layer comprises the polymer film including a compound having reversible light controlled wettability whereby the surface layer is reversibly hydrophilic and hydrophobic and wherein a portion of the surface layer comprises a fixed non-variable image area to provide a surface layer having a variable image area and a fixed image area.

11. A lithographic printing method comprising:
- exposing an imaging surface layer of a printing plate to a first light expose source to render the surface layer uniformly hydrophobic;
- wherein the surface layer comprises a polymer film including a compound having reversible light controlled wettability whereby the surface layer is reversibly hydrophobic and hydrophilic hydrophobic upon exposure to different wavelengths of light;
- wherein the surface layer is disposed over a portion of the printing plate imaging surface, or wherein the surface layer is disposed over substantially all of the printing plate imaging surface;
- exposing the surface layer to a second light expose source in an image-wise fashion to render image areas of the surface layer hydrophilic;
- exposing the surface layer to a non-polar liquid wherein the non-polar liquid attracts to non-image hydrophobic areas;
- exposing the surface layer to a hydrophilic liquid colorant wherein the hydrophilic liquid colorant attracts to hydrophilic image areas;
- contacting the surface layer with an offset receiving member to transfer the image to the offset receiving member;
- contacting the offset receiving member with an image receiving substrate to transfer the image thereto;
- fixing the image; and
- optionally, treating the surface layer to remove residual hydrophilic liquid colorant.

* * * * *